US011212855B2

(12) United States Patent
Yang et al.

(10) Patent No.: US 11,212,855 B2
(45) Date of Patent: Dec. 28, 2021

(54) METHOD AND TERMINAL FOR CONTROLLING SHARED DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN); Hai Tang, Guangdong (CN)

(73) Assignee: SHENZHEN HEYTAP TECHNOLOGY CORP., LTD., Guangdong (CN)

(*) Notice: Subject to any disclaimer, the term of this patent is extended or adjusted under 35 U.S.C. 154(b) by 45 days.

(21) Appl. No.: 16/709,610

(22) Filed: Dec. 10, 2019

(65) Prior Publication Data

US 2020/0120731 A1 Apr. 16, 2020

Related U.S. Application Data

(63) Continuation of application No. PCT/CN2017/094784, filed on Jul. 27, 2017.

(51) Int. Cl.
| | |
|---|---|
| *H04N 21/2668* | (2011.01) |
| *H04N 21/442* | (2011.01) |
| *H04W 76/14* | (2018.01) |
| *H04L 29/06* | (2006.01) |
| *H04W 12/06* | (2021.01) |
| *H04W 48/16* | (2009.01) |

(52) U.S. Cl.
CPC ......... *H04W 76/14* (2018.02); *H04L 63/0861* (2013.01); *H04W 12/06* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,229,905 B1 | 1/2016 | Penilla et al. | |
| 9,619,989 B1* | 4/2017 | Ewing | G08B 21/245 |
| 2014/0088793 A1 | 3/2014 | Morgan et al. | |

(Continued)

FOREIGN PATENT DOCUMENTS

| | | |
|---|---|---|
| CN | 101656863 A | 2/2010 |
| CN | 103150183 A | 6/2013 |

(Continued)

OTHER PUBLICATIONS

The EESR of corresponding European application No. 17919376.8, dated Mar. 25, 2020.

(Continued)

*Primary Examiner* — Gary Lafontant
(74) *Attorney, Agent, or Firm* — Ladas & Parry LLP (57) ABSTRACT

Implementations of the present disclosure disclose a method and a terminal for controlling a shared device, the method includes: a user device establishes a connection with a shared device; the user device triggers the shared device to acquire personalized configuration information of a user, where the personalized configuration information is used for indicating a configuration preference of the user for the shared device. The method and the terminal in the implementations of the present disclosure are beneficial to improving user experience.

20 Claims, 5 Drawing Sheets

(56) References Cited

U.S. PATENT DOCUMENTS

| | | | | |
|---|---|---|---|---|
| 2014/0223170 | A1* | 8/2014 | Reynolds | H04L 45/24 713/153 |
| 2015/0312608 | A1* | 10/2015 | Higa | H04N 21/4668 725/13 |
| 2019/0213329 | A1* | 7/2019 | Meriac | G06F 9/455 |

FOREIGN PATENT DOCUMENTS

| | | | |
|---|---|---|---|
| CN | 105068467 A | 11/2015 | |
| CN | 106331178 A | 1/2017 | |
| JP | 2002049488 A | 2/2002 | |
| JP | 2006093882 A | 4/2006 | |
| JP | 2011076185 A | 4/2011 | |
| JP | 2016517057 A | 6/2016 | |
| JP | 6132037 B1 | 5/2017 | |
| WO | 2008042242 A2 | 4/2008 | |
| WO | 2015045556 A1 | 4/2015 | |
| WO | 2015182350 A1 | 12/2015 | |

OTHER PUBLICATIONS

The first Office Action of corresponding Japanese application No. 2019-565382, dated Apr. 23, 2021.

The first Office Action of corresponding Indian application No. 201917050031, dated May 17, 2021.

The first Office Action of corresponding European application No. 17919376.8 , dated Jul. 20, 2021.

The second Office Action of corresponding Japanese application No. 2019-565382, dated Aug. 24, 2021.

* cited by examiner

METHOD AND TERMINAL FOR CONTROLLING SHARED DEVICE

CROSS-REFERENCE TO RELATED APPLICATIONS

This application is a continuation of International Application No. PCT/CN2017/094784, filed on Jul. 27, 2017, the content of which is incorporated herein by reference in its entirety.

TECHNICAL FIELD

Implementations of the present disclosure relates to the field of communications, and more particularly to a method and a terminal for controlling a shared device.

BACKGROUND

In the future life, sharing has become a more and more popular mode, users can share bicycles, share cars, and even share computers and TVs in the future, but sharing has a problem of depersonalization. For example, some user tends to adjust a background color of a Word document on his/her computer into a protective color, when the user needs to use the Word document on the shared computer to work, since the shared computer is usually configured with an initial configuration, the user either performs a manual configuration or uses the initial configuration.

SUMMARY

In view of this, the implementations of the present disclosure provide a method for controlling a shared device, and a terminal.

In a first aspect, a method for controlling a shared device is provided. The method includes: establishing, by a user device, a connection with a shared device; triggering, by the user device, the shared device to acquire personalized configuration information of a user, where the personalized configuration information is used for indicating a configuration preference of the user for the shared device.

In an implementation, the user device and the shared device in the implementation of the present disclosure need to have an interface connected to a further terminal respectively, the interface can be wired, such as an extension of an existing Type-C interface that has been defined; the interface can also be wireless, such as Sidelink in the long term evolution (LTE) or wireless fidelity (WiFi).

In a possible implementation, the establishing, by a user device, a connection with a shared device includes: transmitting, by the user device, confirmation information to the shared device when the user device determines that the shared device is capable of establishing a connection with the user device, where the confirmation information is used for confirming, to the shared device, the connection with the user device.

In an implementation, the confirmation information may be simply a piece of default information, or may be authentication information for accessing the shared device. That is to say, the user device can input a password to the shared device when the connection is confirmed, and the shared device performs matching.

In a possible implementation, the method also includes: receiving, by the user device, a discovery message transmitted by the shared device, where the discovery message is used for indicating that the shared device is in an unoccupied state; and determining, by the user device according to the discovery message, that the shared device is capable of establishing a connection with the user device.

In a possible implementation, the method also includes: transmitting, by the user device, connection request information to the shared device, where the connection request information is used for requesting a connection with the shared device, receiving, by the user device, response information for the connection request information transmitted by the shared device, where the response information is used for indicating that the shared device is connectable to the user device; and determining, by the user device according to the response information, that the shared device is capable of establishing a connection with the user device.

In an implementation, when the shared device is occupied, the shared device does not transmit a discovery message to the user device. Alternatively, the shared device does not respond to the request of the user device, that is, the shared device may reject the connection with the user device.

In the implementation of the present disclosure, the user device can also transmit the user's data to the shared device. The user's data may be a document operated by the user, or may be a piece of music that the user likes, or a video that the user likes.

In a possible implementation, the triggering, by the user device, the shared device to acquire personalized configuration information of a user includes: transmitting, by the user device, the personalized configuration information to the shared device.

In a possible implementation, before the transmitting, by the user device, the personalized configuration information of the user to the shared device, the method also includes: acquiring, by the user device, the personalized configuration information.

In a possible implementation, the acquiring, by the user device, the personalized configuration information includes: acquiring, by the user device, identity information of the user; and acquiring, by the user device, the personalized configuration information according to the identity information.

In a possible implementation, the acquiring, by the user device, the personalized configuration information according to the identity information includes: acquiring, by the user device, personalized configuration information corresponding to the identity information from a stored personalized configuration database according to the identity information, where the personalized configuration database includes at least one piece of identity information of the user and at least one piece of personalized configuration information that has a one-to-one correspondence with the at least one piece of identity information of the user.

In an implementation, the personalized configuration database can be stored in the user device, or can be stored in a further terminal or a server, when the user device needs to transmit the personalized configuration information of the user to the shared device, the user device may transmit the identity information of the user to the further terminal or the server, and acquire the personalized configuration information corresponding to the user from the personalized configuration database.

In a possible implementation, the acquiring, by the user device, the personalized configuration information according to the identity information includes: transmitting, by the user device, the identity information to a server; and receiving, by the user device, personalized configuration information corresponding to the identity information transmitted by the server.

In a possible implementation, the triggering, by the user device, the shared device to acquire personalized configuration information of a user includes: transmitting, by the user device, the identity information of the user to the shared device, so that the shared device acquires personalized configuration information corresponding to the identity information from a server.

The personalized configuration information of the user may be stored in the server, and may not occupy memory of the user device.

In a possible implementation, the identity information includes password information and/or biometric information.

The personalized configuration database may be a table, where the table is a correspondence table between the user's identity information and the personalized configuration information, for example, it may be a correspondence table between a password input by the user and the personalized configuration information, or may be a correspondence table between biometric information of the user and the personalized configuration information, or may also be a correspondence table between the password plus the biometric information and the personalized configuration information.

In a possible implementation, the biometric information includes at least one of fingerprint feature information, iris feature information, face feature information, voiceprint feature information, vein feature information, and retinal feature information.

In a possible implementation, the method also includes: transmitting, by the user device, clear information to the shared device, where the clear information is used for indicating that the shared device is resumed to a configuration prior to the user's use.

In a second aspect, a method for controlling a shared device is provided. The method includes: establishing, by a shared device, a connection with a user device; acquiring, by the shared device, personalized configuration information of a user according to received first information transmitted by the user device, where the personalized configuration information is used for indicating a configuration preference of the user for the shared device; and configuring, by the shared device, the shared device according to the personalized configuration information.

In a possible implementation, the establishing, by a shared device, a connection with a user device includes: transmitting, by the shared device, a discovery message to the user device, where the discovery message is used for indicating that the shared device is in an unoccupied state; and receiving, by the shared device, confirmation information transmitted by the user device, where the confirmation information is used for confirming, to the shared device, the connection with the user device.

In a possible implementation, the establishing, by a shared device, a connection with a user device includes: receiving, by the shared device, connection request information transmitted by the user device, where the connection request information is used for requesting a connection with the shared device; transmitting, by the shared device, response information for the connection request information to the user device, where the response information is used for indicating that the shared device is connectable to the user device; and receiving, by the shared device, confirmation information transmitted by the user device, where the confirmation information is used for confirming, to the shared device, the connection with the user device.

In a possible implementation, the first information is personalized configuration information of the user.

In a possible implementation, the first information is identity information of the user, and the acquiring, by the shared device, personalized configuration information of a user according to received first information transmitted by the user device includes: acquiring, by the shared device, the personalized configuration information according to the identity information.

In a possible implementation, the acquiring, by the shared device, the personalized configuration information according to the identity information includes: transmitting, by the shared device, the identity information to a server; and receiving, by the shared device, personalized configuration information corresponding to the identity information transmitted by the server.

In a possible implementation, the method also includes: receiving, by the shared device, clear information transmitted by the user device, where the clear information is used for indicating that the shared device is resumed to a configuration prior to the user's use; and resuming, by the shared device, the shared device to the configuration prior to the user's use according to the clear information.

In a third aspect, a terminal is provided, for performing the method in the first aspect described above or any possible implementation of the first aspect. Specifically, the terminal includes a unit for performing the method in the first aspect described above or any possible implementation of the first aspect.

In a fourth aspect, a terminal is provided, for performing the method in the second aspect described above or any possible implementation of the second aspect. Specifically, the terminal includes a unit for performing the method in the second aspect described above or any possible implementation of the second aspect.

In a fifth aspect, a terminal is provided. The terminal includes: a memory, a processor, an input interface, and an output interface. The memory, the processor, the input interface and the output interface are connected via a bus system. The memory is configured to store instructions, and the processor is configured to execute the instructions stored in the memory, for performing the method in the first aspect described above or any possible implementation of the first aspect.

In a sixth aspect, a terminal is provided. The terminal includes: a memory, a processor, an input interface, and an output interface. The memory, the processor, the input interface and the output interface are connected via a bus system. The memory is configured to store instructions, and the processor is configured to execute the instructions stored in the memory, for performing the method in the second aspect described above or any possible implementation of the second aspect.

In a seventh aspect, a computer storage medium is provided, for storing computer software instructions used for execution of the method in the first aspect described above or any possible implementation of the first aspect, or of the method in the second aspect described above or any possible implementation of the second aspect, where the computer software instructions include programs designed for performing the above aspects.

In an eighth aspect, a computer program product including instructions is provided, which when operable on a computer, causes the computer to perform the method in the first aspect described above or any possible implementation of the first aspect, or the method in the second aspect described above or any possible implementation of the second aspect.

These and other aspects of the present disclosure will be more concise in the description of the following implementations.

DETAILED DESCRIPTION OF THE IMPLEMENTATIONS

The technical solutions in the implementations of the present disclosure will be described hereunder clearly and comprehensively with reference to the accompanying drawings in the implementations of the present disclosure.

The technical solutions of the implementation of the present disclosure can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, a LTE Frequency Division Duplex (FDD) system, LTE Time Division Duplex (TDD), Universal Mobile Telecommunication System (UMTS), Worldwide Interoperability for Microwave Access (WiMAX) Communication systems or future 5G systems, etc.

In particular, the technical solutions of the implementations of the present disclosure can be applied to various communication systems based on non-orthogonal multiple access technologies, for example, a Sparse Code Multiple Access (SCMA) system, a Low Density Signature (LDS) system, etc., of course, the SCMA system and the LDS system can also be called other names in the field of communication; further, the technical solutions of the implementation of the present disclosure can be applied to a multi-carrier transmission system using non-orthogonal multiple access technologies, for example, Orthogonal Frequency Division Multiplexing (OFDM), Filter Bank Multi-Carrier (FBMC), Generalized Frequency Division Multiplexing (GFDM), Filtered-OFDM (F-OFDM) systems using non-orthogonal multiple access technologies, etc.

The user device in the implementation of the present disclosures may be implemented in various forms. For example, the user device in the implementations of the present disclosure may be referred to as a User Equipment (UE), an access terminal, a subscriber unit, a subscriber station, a mobile station, a remote station, a remote terminal, a mobile device, a user device, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with wireless communication capabilities, a computing device or other processing device connected to the wireless modem, an in-vehicle device, a wearable device, a terminal device in a future 5G network, or a terminal device in a future evolved Public Land Mobile Network (PLMN), etc., the implementations of the disclosure are not limited thereto.

The shared device in the implementations of the present disclosure may also be implemented in various forms, such as a shared computer, a shared mobile phone, a shared bicycle, a shared car, even a shared TV, etc. The shared device can also be a smart TV, a smart refrigerator, a smart air conditioner, a smart alarm clock, or the like in a hotel. It can also be a smart seat on an aircraft, etc. However, these are simply examples in the implementations of the present disclosure, and should not be construed as limiting the implementations of the present disclosure.

Figure 1:
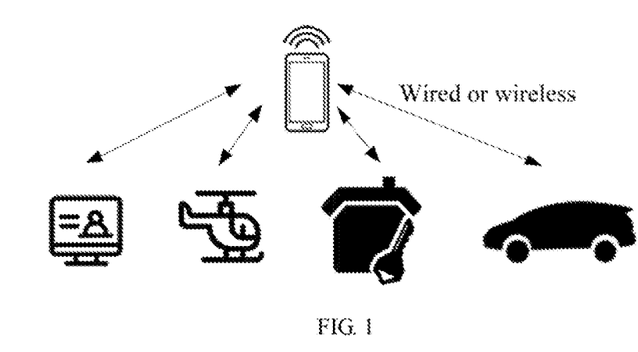
FIG. 1 shows a schematic diagram illustrating an disclosure scenario according to an implementation of the present disclosure.

FIG. 1 is a schematic diagram illustrating an application scenario according to an implementation of the present disclosure. As shown in FIG. 1, a user device such as a mobile phone can respectively control a computer, a further terminal on an airplane, a further terminal in a room, and a vehicle terminal.

Figure 2:
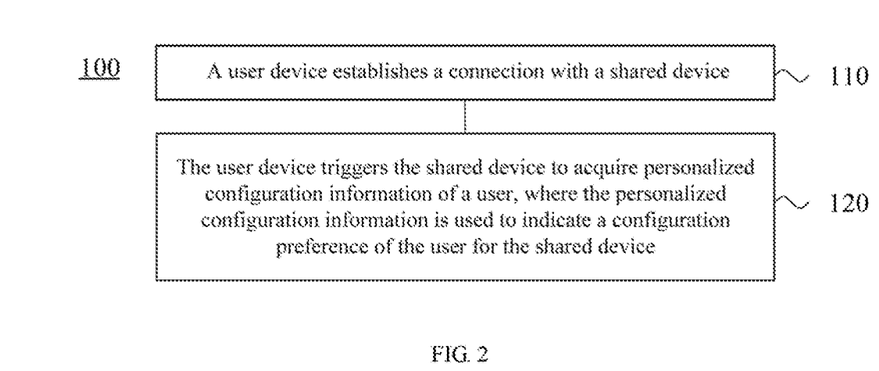
FIG. 2 shows a schematic block diagram of a method for controlling a shared device according to an implementation of the present disclosure.

FIG. 2 shows a schematic block diagram of a method for controlling a shared device according to an implementation of the present disclosure. As shown in FIG. 2, the method 100 includes some or all of following steps:

S110, a user device establishes a connection with a shared device;

S120, the user device triggers the shared device to acquire personalized configuration information of a user, where the personalized configuration information is used for indicating a configuration preference of the user for the shared device.

It should be noted that, the user device and the shared device in the implementation of the present disclosure need to have an interface connected to a further terminal respectively, the interface can be wired, such as an extension of an existing Type-C interface that has been defined; the interface can also be wireless, such as Sidelink in the LTE or WiFi.

Specifically, when a user device wants to control a shared device, the user device may first establish a connection with the shared device, for example, the connection may be established by mutual confirmation. That is to say, the user device must first be willing to connect to the shared device, and the shared device allows the connection with or can be connected to the user device. After the user device and the shared device mutually confirm each other, the user device may trigger the shared device to acquire personalized configuration information of a certain user, and then the shared device can be configured according to the personalized configuration information of the user. For example, the shared device is a computer and the user device is a mobile phone. The user may transmit his/her favorite computer desktop and configuration of a common software such as Word to the shared computer through the mobile phone, after the shared computer receives the personalized configuration information transmitted by the mobile phone, the shared computer can be configured into his/her preferred configuration.

Therefore, according to the method for controlling the shared device in the implementation of the present disclosure, the user device acquires the personalized configuration information of the user by triggering the shared device, so that the shared device can be configured according to the user's preference, thereby improving user experience.

In an implementation, the implementation of the present disclosure can be applied to the following scenarios:

Scenario 1: when a user is having a meeting outside the office or working outside the office, there is no need to bring any personal computer and other related equipment, if the user need more powerful processing or display functions, the user can use a mobile phone to connect to any shared device as desired, such as a public computer in a conference room or even a public computer at Starbucks, the user can configure it as his/her own personal computer in a personalized way.

Scenario 2: when a user takes a shared vehicle such as a private plane or a car, the vehicle can be connected via a mobile phone, so that it can be provided with personalized configurations to meet the user's preferences and habits, these personalized configurations can be downloaded from a cloud via the mobile phone or configured via the mobile phone, and the personalized configurations include temperature and humidity inside the vehicle, favorite entertainment programs, hardness and angles of the seats, angles of the front and rear mirrors, etc.

Scenario 3: after coming to a new city to check in a new hotel, rent or buy a new house, the user can connect the mobile phone to the smart control system of the house, and then personalize the house through the mobile phone, including temperature and humidity in the house, color of walls and floors, time of an alarm clock, a TV broadcast channel, temperature of bath water, etc.

It should be understood that the foregoing several possible scenarios are only part of the application scenario of the implementation of the present disclosure, and the implementation of the present disclosure is not limited thereto.

In the implementation of the present disclosure, a user device establishing a connection with a shared device includes: when the user device determines that the shared device is capable of establishing a connection with the user device, the user device transmits confirmation information to the shared device, where the confirmation information is used for confirming, to the shared device, the connection with the user device.

Specifically, when the user device determines that the shared device can establish a connection with the user device, it can transmit confirmation information to the shared device, where the confirmation information may be simply a piece of default information, or may be authentication information for accessing the shared device. For example, the shared device can establish a connection with the user device by default, and the user device establishes the connection with the shared device as long as the user device transmits connection information. For another example, the shared device may also be provided with a piece of authentication information for establishing a connection with a further terminal. When the shared device can establish a connection with the user device, the user device needs to output a piece of authentication information, such as a password, to the shared device and perform matching at the shared device, if the matching at the shared device is successful, the user device successfully connects to the shared device.

In the implementation of the present disclosure, the method also includes: the user device receives a discovery message transmitted by the shared device, where the discovery message is used for indicating that the shared device is in an unoccupied state; and the user device determines, according to the discovery message, that the shared device is capable of establishing a connection with the user device.

Specifically, the shared device periodically transmits a discovery message, after detecting the discovery message, the user device presents it to the user through an operating system interface, the user can confirm the connection through the user device, during the connection, a password can be input, and the user device completes the matching with the shared device.

It should be understood that the shared device may transmit the discovery message only when it is not occupied, that is, if the user device does not detect the discovery message of the shared device, the user device may determine that the shared device is occupied, and further the user device cannot establish the connection with the shared device.

For example, after the user carries the mobile phone into the hotel room, the television periodically transmits the discovery message to the mobile phone, when the phone detects the discovery message, the mobile phone can confirm the connection to the TV by virtue of an entered password. Then when the user wants to watch the TV, the mobile phone may transmit the configuration of the TV station that the user often watches to the TV such as Hunan Satellite TV, when the TV is turned on, the TV can be directed to Hunan Satellite TV and the user does not need to use a remote control to find Hunan Satellite TV in the playlist.

In the implementation of the present disclosure, the method also includes: the user device transmits connection request information to the shared device, where the connection request information is used for requesting a connection with the shared device; the user device receives response information for the connection request information transmitted by the shared device, where the response information is used for indicating that the shared device is connectable to the user device; and the user device determines, according to the response information, that the shared device is capable of establishing a connection with the user device.

Specifically, the user device may transmit handshake information to the shared device, and the shared device feeds back a response, the user device presents it to the user through the operating system interface, and the user can confirm the connection through the user device, and can input a password during the connection, and the user device completes matching with the shared device.

It should be understood that it is assumed here that the shared device is open in itself, allowing a personalized configuration from the user device. If the shared device is in use, the shared device can feed back connection failure information to the user device, and then the user device can know that the connection is not established with the shared device.

For example, after a user carries a mobile phone into Starbucks, if the user needs to work in Starbucks, the user may transmit connection request information to a computer at Starbucks through the mobile phone, if the computer at Starbucks is not occupied at this time, the computer may respond to the user's mobile phone with a response, further, the user can click on the confirmation via the mobile phone, and the user's mobile phone and the computer at Starbucks are successfully connected. Assuming that the user usually adjusts the background color to a protective color when using Word, the user may further transmit a configuration to the computer at Starbucks to adjust the background color of Word to a protective color, when the user uses Word on the computer at Starbucks, the user does not need to make further adjustments, the background color of Word is directly turned into the protective color.

In the implementation of the present disclosure, the user device may also transmit the user's data to the shared device. For example, when a user needs to use a computer at Starbucks, the user may transmit a document that the user needs to the computer at Starbucks through the user device. Then the user can continue working on the previous document.

It should be understood, the user's data may be a document operated by the user, or may be a piece of music that the user likes, or a video that the user likes.

In the implementation of the present disclosure, the user device triggering the shared device to acquire personalized configuration information of a user includes: the user device transmits the personalized configuration information to the shared device.

The user device triggers the sharing terminal to acquire the personalized configuration information of the user, which may be acquired by the shared device directly or indirectly from the user device. For example, the user device acquires the personalized configuration information of the user, and then transmits the personalized configuration information to the shared device; alternatively, the user device may also transmit some auxiliary information to the shared device to help the shared device to acquire the personalized configuration information of the user.

In the implementation of the present disclosure, before the user device transmits the personalized configuration information of the user to the shared device, the method also includes: the user device acquires the personalized configuration information.

The user device may acquire personalized configuration information of the user for all shared devices, and then transmits its own personalized configuration information to a shared device to be used. It is also possible to acquire only the personalized configuration information of the shared device to be used. For example, the personalized configuration information of all shared devices of each user may be a personalized configuration database. When the user device wants to acquire personalized configuration information of a certain shared device, the user device may first acquire an identifier of the shared device, and then find personalized configuration information of the shared device according to the identifier of the shared device. For another example, if the user device is stored with personalized configuration information of only one shared device, when the user device needs to use the shared device, the user device can directly transmit its personalized configuration information to the shared device. The user device can also directly transmit the personalized configuration information of the user for all shared devices to a certain shared device; the shared device can acquire the personalized configuration information corresponding thereto according to its own identifier, thereby configuring the shared device.

In the implementation of the present disclosure, the user device acquiring the personalized configuration information includes: the user device acquires identity information of the user; and the user device acquires the personalized configuration information from a personalized configuration database according to the identity information, where the personalized configuration database includes at least one piece of identity information of the user and at least one piece of personalized configuration information that has a one-to-one correspondence with the at least one piece of identity information of the user.

Specifically, the personalized configuration database can be stored inside the user device, or can also be stored in other terminals or devices such as servers, when the user device wants to acquire personalized configuration information of a certain user, the user device may transmit the identity information of the user to a further terminal or a server, the further terminal or the server may then find the personalized configuration information of the user in the personalized configuration database, and then the further terminal or the server may transmit the found personalized configuration information of the user to the user device, and the user device can further forward the personalized configuration information of the user to the shared device.

In the implementation of the present disclosure, before using personalized configuration information of a certain user, the user device may first establish a personalized configuration database or acquire the personalized configuration database elsewhere. The personalized configuration database can be updated at any time.

It should be understood that, in the implementation of the present disclosure, the identity information of the user may be password information input by the user, for example, the personalized configuration database may be a table of the user's password and personalized configuration information, which can be shown in Table 1.

TABLE 1

| User | Password | Personalized configuration information |
|---|---|---|
| User 1 | 12345678 | Air conditioning temperature is 25 degrees, and the computer desktop is a picture of blue sky |
| User 2 | 23456789 | An aircraft seat is 60 degree tilted and a shared bicycle has a height of 60 cm |
| User 3 | 34577890 | A TV station is Hunan Satellite TV and an alarm clock is 7:00 in the morning |

Assume that Table 1 is stored in the server. When User 1 enters the hotel room, User 1's mobile phone can send the user's identity information to the server, for example, if the user enters the password 12345678 on the mobile phone to trigger the server to find personalized configuration information of User 1 in Table 1, the mobile phone of User 1 may acquire the personalized configuration information of User 1, including: air conditioning temperature is 25 degrees, and the computer desktop is a picture of blue sky, further, the mobile phone of User 1 may transmit the personalized configuration information of User 1 to a hotel air conditioner, and the hotel air conditioner can directly set the temperature to 25 degrees.

In the implementation of the present disclosure, the user device triggering the shared device to acquire personalized configuration information of the user includes: the user device transmits the identity information of the user to the shared device, so that the shared device acquires personalized configuration information corresponding to the identity information from a server. The user device may transmit the identity information of the user to the shared device, so that the shared device acquires the personalized configuration information of the user from the server. The process is similar to the process in which the user device transmits the user's identity information to the server to acquire the personalized configuration information of the user, so details will be omitted herein.

It also should be understood, the identity information of the user may also be at least one of biometric information of the user, such as fingerprint feature information, iris feature information, face feature information, voiceprint feature information, vein feature information, and retinal feature information.

Specifically, the biometric information may be fingerprint recognition and hand shape recognition that are relatively mature technologies in the current market, or may be face recognition that has attracted attention and developed rapidly at the present stage, it may also be iris recognition, finger vein recognition, voiceprint recognition, signature recognition, gait recognition, keyboard tapping habit recognition, deoxyribonucleic acid (DNA) recognition and other biometric identification technologies, it is even possible to use biometric fusion or multimodal biometrics technology to authenticate users' identities in the future.

The above Table 1 may also be a combination of a password and any biometrics mapped with the user's personalized configuration information. The mapping relationship in Table 1 is not limited in the implementation of the present disclosure, as long as the information capable of authenticating the identity of the user can be mapped with the personalized configuration information.

In the implementation of the present disclosure, the method also includes: the user device transmits clear information to the shared device, where the clear information is used for indicating that the shared device is resumed to a configuration prior to the user's use.

That is to say, when the user leaves, the user device transmits indication information to the shared device, indicating that the shared device is resumed to an initial setting. For example, when a user enters a hotel room, a personalized configuration is performed for the air conditioner at the room through a mobile phone, it may be provided that the user will leave at 12 noon the next day, and then an instruction will be automatically transmitted to the air conditioner at 12 o'clock to resume it to the previous setting. For another example, it also may be a case that the shared device is automatically resumed to the previous setting when the user device is disconnected from the shared device.

Figure 3:
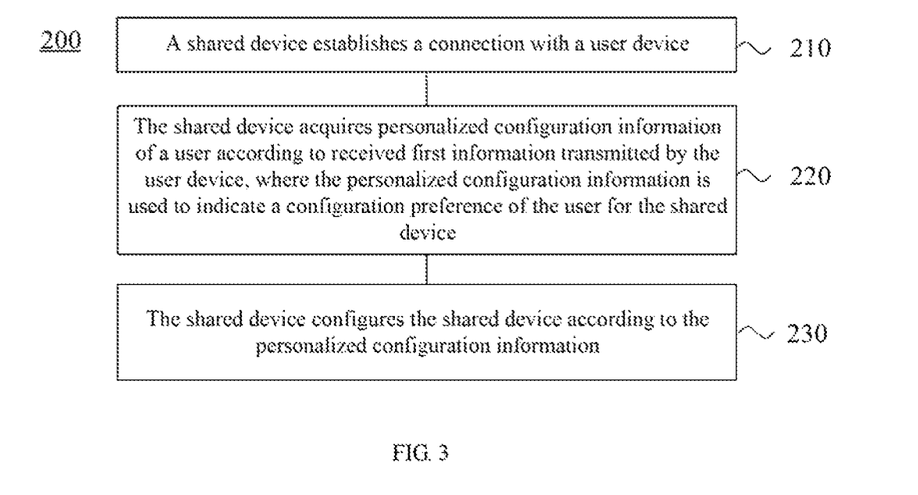
FIG. 3 shows another schematic block diagram of a method for controlling a shared device according to an implementation of the present disclosure.

FIG. 3 shows a schematic block diagram for controlling a shared device 200 according to an implementation of the present disclosure. As shown in FIG. 3, the method 200 includes some or all of following steps:

S210, a shared device establishes a connection with a user device;

S220, the shared device acquires personalized configuration information of a user according to received first information transmitted by the user device, where the personalized configuration information is used for indicating a configuration preference of the user for the shared device; and S230, the shared device configures the shared device according to the personalized configuration information.

Therefore, according to the method for controlling the shared device in the implementation of the present disclosure, the shared device acquires the personalized configuration information of the user according to the received information transmitted by the user device, so that the configuration can be performed according to the user's preference, thereby improving user experience.

In the implementation of the present disclosure, a shared device establishing a connection with a user device includes: the shared device transmits a discovery message to the user device, where the discovery message is used for indicating that the shared device is in an unoccupied state; and the shared device receives confirmation information transmitted by the user device, where the confirmation information is used for confirming, to the shared device, the connection with the user device.

In the implementation of the present disclosure, a shared device establishing a connection with a user device includes: the shared device receives connection request information transmitted by the user device, where the connection request information is used for requesting a connection with the shared device; the shared device transmits response information for the connection request information to the user device, where the response information is used for indicating that the shared device is connectable to the user device; and the shared device receives confirmation information transmitted by the user device, where the confirmation information is used for confirming, to the shared device, the connection with the user device.

In the implementation of the present disclosure, the first information is personalized configuration information of the user.

In the implementation of the present disclosure, the first information is identity information of the user, and the shared device acquiring personalized configuration information of a user according to received first information transmitted by the user device includes: the shared device acquires the personalized configuration information according to the identity information.

In the implementation of the present disclosure, the shared device acquiring the personalized configuration information according to the identity information includes: the shared device transmits the identity information to a server; and the shared device receives the personalized configuration information corresponding to the identity information transmitted by the server.

In the implementation of the present disclosure, the method also includes: the shared device receives clear information transmitted by the user device, where the clear information is used for indicating that the shared device is resumed to a configuration prior to the user's use; and the shared device resumes the shared device to the configuration prior to the user's use according to the clear information.

It should be understood that, sequence numbers of the above processes do not mean an order of execution, and the order of execution of each process should be determined by its function and internal logic, but should not constitute any limitation to implementation processes of the implementations of the present disclosure.

Although this disclosure and its advantages have been described in detail, it should be understood, various changes, substitutions and alterations can be made to the present disclosure without departing from the spirit and scope of the present disclosure as defined by the appended claims.

It should be understood that, interactions between the shared device and the user device as well as related characteristics and functions described at the shared device are corresponding to related characteristics and functions at the user device. And the related content has been described in detail in the above method 100, for brevity, no further description is provided herein.

The methods for controlling the shared device according to the implementations of the present disclosure have been described in detail above, and devices according to the implementations of the present disclosure will be described below with reference to FIG. 4 to FIG. 7. Technical features described in the method implementations are applicable to following device implementations.

Figure 4:
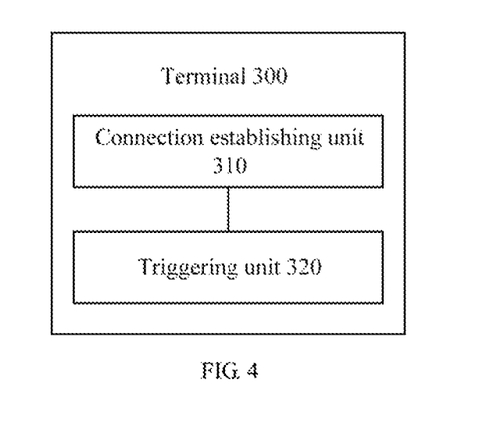
FIG. 4 shows a schematic block diagram of a terminal according to an implementation of the present disclosure.

FIG. 4 shows a schematic block diagram of a terminal 300 according to an implementation of the present disclosure. As shown in FIG. 4, the terminal 300 includes:

a connection establishing unit 310, configured to establish a connection with a shared device; and a triggering unit 320, configured to trigger the shared device to acquire personalized configuration information of a user, where the personalized configuration information is used for indicating a configuration preference of the user for the shared device.

Therefore, the terminal in the implementation of the present disclosure acquires the personalized configuration information of the user by triggering the shared device, so that the shared device can be configured according to the user's preference, thereby improving user experience.

In the implementation of the present disclosure, the connection establishing unit is specifically configured to: when the terminal determines that the shared device is capable of establishing a connection with the terminal, transmit confirmation information to the shared device, where the confirmation information is used for confirming, to the shared device, the connection with the terminal.

In the implementation of the present disclosure, the terminal also includes: a first receiving unit, configured to receive a discovery message transmitted by the shared device, where the discovery message is used for indicating that the shared device is in an unoccupied state; and a first determining unit, configured to determine, according to the discovery message, that the shared device is capable of establishing a connection with the terminal.

In the implementation of the present disclosure, the terminal also includes: a first transmitting unit, configured to transmit connection request information to the shared device, where the connection request information is used for requesting a connection with the shared device; a second receiving unit, configured to receive response information for the connection request information transmitted by the shared device, where the response information is used for indicating that the shared device is connectable to the terminal; and a second determining unit, configured to determine, according to the response information, that the shared device is capable of establishing a connection with the terminal.

In the implementation of the present disclosure, the triggering unit is specifically configured to: transmit the personalized configuration information to the shared device.

In the implementation of the present disclosure, the terminal also includes: an acquiring unit, configured to acquire the personalized configuration information.

In the implementation of the present disclosure, the acquiring unit is specifically configured to: acquire identity information of the user; and acquire the personalized configuration information according to the identity information.

In the implementation of the present disclosure, the acquiring unit is specifically configured to: acquire personalized configuration information corresponding to the identity information from a stored personalized configuration database according to the identity information, where the personalized configuration database includes at least one piece of identity information of the user and at least one piece of personalized configuration information that has a one-to-one correspondence with the at least one piece of identity information of the user.

In the implementation of the present disclosure, the acquiring unit is specifically configured to: transmit the identity information to the server; and receive personalized configuration information corresponding to the identity information transmitted by the server.

In the implementation of the present disclosure, the triggering unit is specifically configured to: transmit the identity information of the user to the shared device, so that the shared device acquires personalized configuration information corresponding to the identity information from a server.

In the implementation of the present disclosure, the identity information includes password information and/or biometric information.

In the implementation of the present disclosure, the biometric information includes at least one of fingerprint feature information, iris feature information, face feature information, voiceprint feature information, vein feature information, and retinal feature information.

In the implementation of the present disclosure, the terminal also includes: a second transmitting unit, configured to transmit clear information to the shared device, where the clear information is used for indicating that the shared device is resumed to a configuration prior to the user's use.

It should be understood that, the terminal 300 according to the implementation of the present disclosure may correspond to the user device in the method implementation of the present disclosure, and the above and other operations and/or functions of the respective units in the terminal 300 are respectively used to implement the corresponding processes of the user device in the method of FIG. 2, for brevity, details will not be described herein again.

Figure 5:
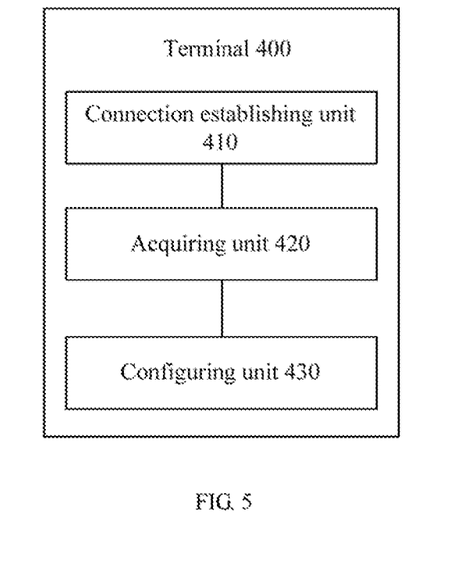
FIG. 5 shows another schematic block diagram of a terminal according to an implementation of the present disclosure.

FIG. 5 shows a schematic block diagram of a terminal 400 according to an implementation of the present disclosure. As shown in FIG. 5, the terminal 400 includes:

a connection establishing unit 410, configured to establish a connection with a user device:

an acquiring unit 420, configured to acquire personalized configuration information of a user according to received first information transmitted by the user device, where the personalized configuration information is used for indicating a configuration preference of the user for the shared device; and a configuring unit 430, configured to configure the shared device according to the personalized configuration information.

Therefore, the terminal in the implementation of the present disclosure acquires the personalized configuration information of the user according to the received information transmitted by the user device, so that the configuration can be performed according to the user's preferences, thereby improving user experience.

In the implementation of the present disclosure, the connection establishing unit is specifically configured to: transmit a discovery message to the user device, where the discovery message is used for indicating that the terminal is in an unoccupied state; and receive confirmation information transmitted by the user device, where the confirmation information is used for confirming, to the terminal, the connection with the user device.

In the implementation of the present disclosure, the connection establishing unit is specifically configured to: receive connection request information transmitted by the user device, where the connection request information is used for requesting a connection with the terminal; transmit response information for the connection request information to the user device, where the response information is used for indicating that the terminal is connectable to the user device; and receive confirmation information transmitted by the user device, where the confirmation information is used for confirming, to the terminal, the connection with the user device.

In the implementation of the present disclosure, the first information is personalized configuration information of the user.

In the implementation of the present disclosure, the first information is identity information of the user, and the acquiring unit is specifically configured to: acquire the personalized configuration information according to the identity information.

In the implementation of the present disclosure, the acquiring unit is specifically configured to: transmit the identity information to a server; and receive personalized configuration information corresponding to the identity information transmitted by the server.

In the implementation of the present disclosure, the terminal also includes: a receiving unit, configured to receive clear information transmitted by the user device, where the clear information is used for indicating that the terminal is resumed to a configuration prior to the user's use; and a resuming unit, configured to resume the terminal to the configuration prior to the user's use according to the clear information.

It should be understood that, the terminal 400 according to the implementation of the present disclosure may correspond to the shared device in the method implementation of the present application, and the foregoing and other operations and/or functions of the respective units in the terminal 400 are respectively used to implement the corresponding processes of the user device in the method of FIG. 3, for brevity, details will not be described herein again.

Figure 6:
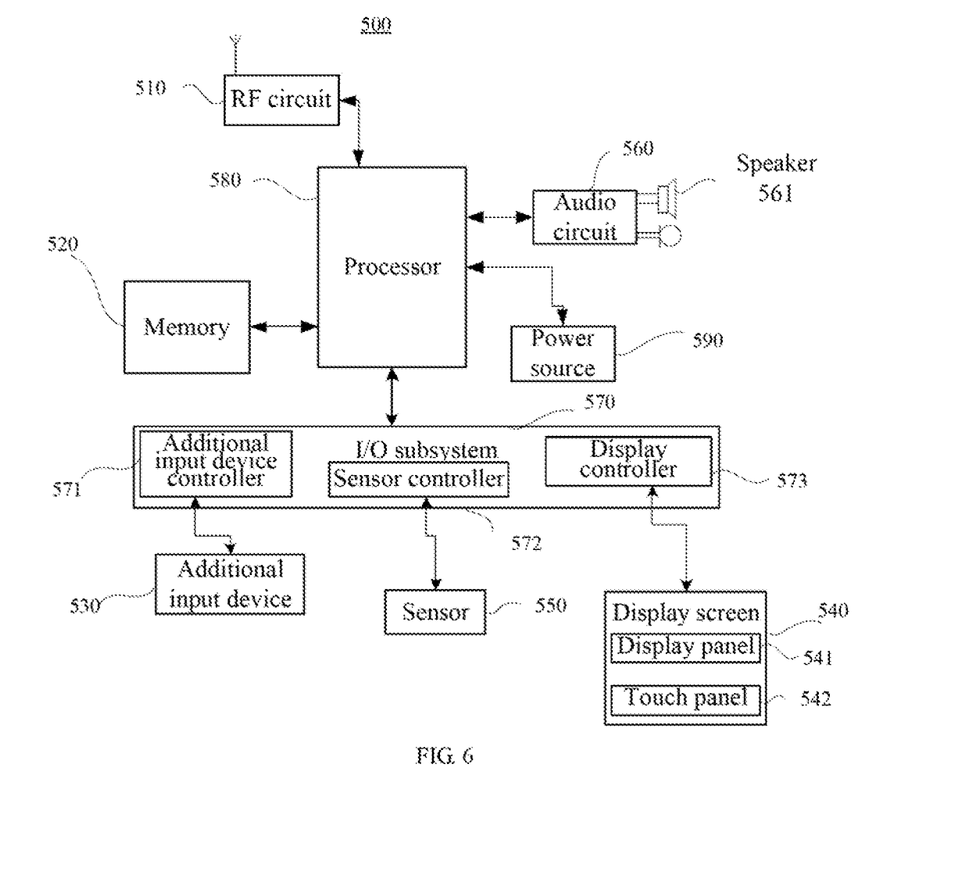
FIG. 6 shows still another schematic block diagram of a terminal according to an implementation of the present disclosure.

FIG. 6 is a schematic block diagram of a terminal 500 according to an implementation of the present disclosure. The terminal 500 shown in FIG. 6 includes components such as a radio frequency (RF) circuit 510, a memory 520, an additional input device 530, a display screen 540, a sensor 550, an audio circuit 560, an I/O subsystem 570, a processor 580, and a power source 590. It will be understood by those skilled in the art that the terminal structure shown in FIG. 6 does not constitute a limitation of the terminal, and may include more or less components than those illustrated, or some components are combined, or some components are removed, or different components are arranged. Those skilled in the art will appreciate that the display screen 540 belongs to a user interface (UI), and the terminal 500 may include more or fewer user interfaces than those illustrated.

The specific components of the terminal 500 will be specifically described below with reference to FIG. 6:

The RF circuit 510 can be configured to receive and transmit signals during a call or during transmitting and receiving information, and in particular, and provide downlink information of a base station to the processor 580 for processing after receiving it; in addition, designed uplink data is transmitted to the base station. Generally, the RF circuit includes, but is not limited to, an antenna, at least one amplifier, a transceiver, a coupler, a Low Noise Amplifier (LNA), a duplexer, etc. In addition, the RF circuit 510 can also communicate with a network and other devices through wireless communication. The wireless communication can use any communication standard or protocol.

The memory 520 may be configured to store software programs and modules; the processor 580 executes various functional applications and data processing of the terminal 500 by running the software programs and the modules stored in the memory 520. The memory 520 can mainly include a program storage area and a data storage area, where the program storage area can be stored with an operating system, an application required for at least one function (such as a sound playing function, an image playing function, etc.), etc.; the data storage area can be stored with data (such as audio data, phone book, etc.) created according to the use of the terminal 500, and the like. Furthermore, the memory 520 may include a high speed random access memory, and may also include a nonvolatile memory such as at least one magnetic disk storage device, a flash memory device, or other volatile solid state storage device.

The additional input device 530 may be configured to receive input numeric or character information, and generate key signal inputs related to user settings and function control of the terminal 500. Specifically, the additional input devices 530 may include, but is not limited to one or more of a physical keyboard, a function key (such as volume control buttons, switch buttons, etc.), a trackball, a mouse, a joystick, an optical mouse (the optical mouse is a touch sensitive surface on which a visual output is not displayed, or an extension of a touch sensitive surface formed by a touch screen), and the like. The additional input device 530 is coupled to an additional input device controller 571 of the I/O subsystem 570 for signal interaction with the processor 580 under control of the additional input device controller 571.

The display screen 540 may be configured to display information input by the user or information provided to the user and various menus of the terminal 500, and can also accept a user input. Specifically, the display screen 544) can include a display panel 541, and a touch panel 542. The display panel 541 can be configured by using a liquid crystal display (LCD) or an organic light-emitting diode (OLED). The touch panel 542, also referred to as a touch screen, a touch sensitive screen or the like, can collect a contact or non-contact operation thereon or nearby by the user (for example, an operation performed by the user on the touch panel 542 or near the touch panel 542 using any suitable object or accessory such as a finger or a stylus, can also include a somatosensory operation, the operation includes a single point control operation, a multi-point control operation, and other operation types), and drive a corresponding connecting device according to a preset program. In an implementation, the touch panel 542 can include two parts: a touch detection device and a touch controller. The touch detection device detects the user's touch orientation and posture, and detects a signal from a touch operation, and transmits the signal to the touch controller, the touch controller receives the touch information from the touch detection device and converts it into information that the processor can process, and then delivers it to the processor 580, and can receive a command transmitted by the processor 580 and execute it. In addition, the touch panel 542 can be implemented by using various types such as resistive, capacitive, infrared, and surface acoustic waves, and the touch panel 542 can also be implemented by using any technology developed in the future. Further, the touch panel 542 can cover the display panel 541, and the user can perform, according to content (including but not limited to a soft keyboard, a virtual mouse, a virtual button, an icon, etc.) displayed by the display panel 541, an operation on or near the touch panel 542 covered by the display panel 541. After the touch panel 542 detects the operation thereon or nearby, it is transmitted to the processor 580 through the I/O subsystem 570 to determine a user input, according to which the processor 580 then provides a corresponding visual output on the display panel 541 via the I/O subsystem 570.

Although in FIG. 5, the touch panel 542 and the display panel 541 function as two independent components to implement the input and input functions of the terminal 500, in some implementations, the touch panel 542 and the display panel 541 can be integrated to implement the input and output functions of the terminal 500.

The terminal 500 may also include at least one type of sensor 550, such as a light sensor, a motion sensor, and other sensors. Specifically, the light sensor may include an ambient light sensor and a proximity sensor, where the ambient light sensor can adjust the brightness of the display panel 541 according to the brightness of the ambient light, and the proximity sensor can turn off the display panel 541 and/or backlight when the terminal 500 moves in proximity to ears. As a type of motion sensor, an accelerometer sensor can detect the magnitude of acceleration in all directions (usually three axes), and can detect the magnitude and direction of gravity at rest, it can be used to identify applications of the gesture of a mobile phone (such as horizontal and vertical screen switching, related games, magnetometer attitude calibration), vibration recognition related functions (such as a pedometer, a tap), etc.; other sensors such as a gyroscope, a barometer, a hygrometer, a thermometer, an infrared sensor, and the like that can be configured in the terminal 500 are not described herein.

The audio circuit 560, the speaker 561, and the microphone 562 can provide an audio interface between the user and the terminal 500. The audio circuit 560 can transmit the received audio data converted signal to the speaker 561, and the speaker 561 converts it to a sound signal for outputting; on the other hand, the microphone 562 converts the collected sound signal into a signal, which is received by the audio circuit 560 and then converted into audio data, and then the audio data is output to the RF circuit 510 for transmission to, for example, another mobile phone, or the audio data is output to the memory 520 for further processing.

The I/O subsystem 570 is configured to control external devices for input and output, and may include an additional input device controller 571, a sensor controller 572, and a display controller 575. In an implementation, one or more additional input device controllers 571 receive signals from the additional input device 530 and/or transmit signals to the additional input device 530, and the additional input device 530 may include a physical button (a press button, a rocker button, etc.), a dial, a slide switch, a joystick, a click wheel, an optical mouse (the optical mouse is a touch sensitive surface on which a visual output is not displayed, or an extension of a touch sensitive surface formed by a touch screen). It should be noted that the additional input device controller 571 can be connected to any one or more of the above devices. The display controller 575 in the I/O subsystem 570 receives signals from the display screen 540 and/or transmits signals to the display screen 540. After the display screen 540 detects a user input, the display controller 575 converts the detected user input into an interaction with a user interface object displayed on the display screen 540, i.e., human-computer interaction is implemented. The sensor controller 572 can receive signals from one or more sensors 550 and/or transmit signals to one or more sensors 550.

The processor 580 is a control center of the terminal 500, which connects various parts of the entire terminal device by using various interfaces and lines, and executes various functions and processing data of the terminal 500 by running or executing software programs and/or modules stored in the memory 520 as well as invoking data stored in the memory 520, thereby monitoring the terminal device integrally. In an implementation, the processor 580 may include one or more processing units; preferably, the processor 580 can integrate an application processor and a modem processor, where the application processor mainly handles operating systems, user interfaces, applications, etc., and the modem processor mainly processes wireless communication. It can be understood that the above modem processor may not be integrated into the processor 580.

Although not shown, the terminal 500 may further include a camera, a Bluetooth module, etc., and details are not described herein again.

It should be understood that, the terminal 500 may correspond to the user device in the method for controlling the shared device according to the implementation of the present disclosure, and the terminal 500 may include a physical unit for performing the method performed by the user device in the above method. Moreover, each physical unit in the terminal 500 and the other operations and/or functions described above are respectively used in the corresponding processes of the foregoing method, for brevity, details are not described herein again.

It should also be understood, the processor 580 in the implementation of the present disclosure may be an integrated circuit chip with signal processing capability. In the implementation process, each step of the foregoing method implementation may be completed by using an integrated logic circuit of hardware in the processor 580 or an instruction in a software form. The processor 580 described above may be a central processing unit (CPU), the processor 580 can also be another general-purpose processor, a digital signal processor (DSP), an application specific integrated circuit (ASIC), a Field Programmable Gate Array (FPGA) or other programmable logic device, discrete gate or transistor logic device, and discrete hardware component. The methods, steps, and logic blocks disclosed in the implementations of the present disclosure may be implemented or executed. The general purpose processor may be a microprocessor or the processor 580 may also be any conventional processor, etc. The steps of the method disclosed in the implementation of the present disclosure may be directly implemented by a hardware decoding processor, or may be performed by using a combination of hardware and software in the decoding processor. The software device can be located in a storage medium mature in the field, such as a random access memory, a flash memory, a read only memory, a programmable read only memory, an electrically erasable programmable memory, a register, or the like. The storage medium is located in the memory, while the processor reads information in the memory, and completes the steps of the foregoing method in combination with the hardware thereof.

It also should be understood, the memory 520 in the implementation of the present disclosure may be a volatile memory or a non-volatile memory, or may include both volatile and non-volatile memories. The non-volatile memory can be a read-only memory (ROM), a programmable read only memory (PROM), an erasable programmable read only memory (EPROM), an electrically erasable programmable read only memory (EEPROM) or a flash memory. The volatile memory can be a random access memory (RAM), which is used as an external cache. By way of illustration but not limitation, many forms of RAMs are available, for example, a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It also should be understood, in the implementation of the present disclosure, "B corresponding to A" means that B is associated with A, and B can be determined according to A. However, it should also be understood that determining B according to A does not mean that B is determined according to A only, but that B can also be determined according to A and/or other information. It should be understood. The term "and/or" herein is merely an association describing associated objects, indicating that there may be three relationships, for example, A and/or B, which can mean: A exists separately, A and B exist simultaneously, and B exists separately. In addition, the character "/" herein generally indicates that contextual objects have an "or" relationship.

In the implementation process, each step of the foregoing method may be completed by using an integrated logic circuit of hardware in the processor or an instruction in a software form. Steps of a method for transmitting an uplink signal disclosed in conjunction with the implementations of the present disclosure may be directly implemented by a hardware processor, or may be performed by using a combination of hardware and software in the processor. The software device can be located in a storage medium mature in the field, such as a random access memory, a flash memory, a read only memory, a programmable read only memory, an electrically erasable programmable memory, a register, or the like. The storage medium is located in the memory, while the processor reads information in the memory, and completes the steps of the foregoing method in combination with the hardware thereof. To avoid repetition, details will not be described herein again.

Figure 7:
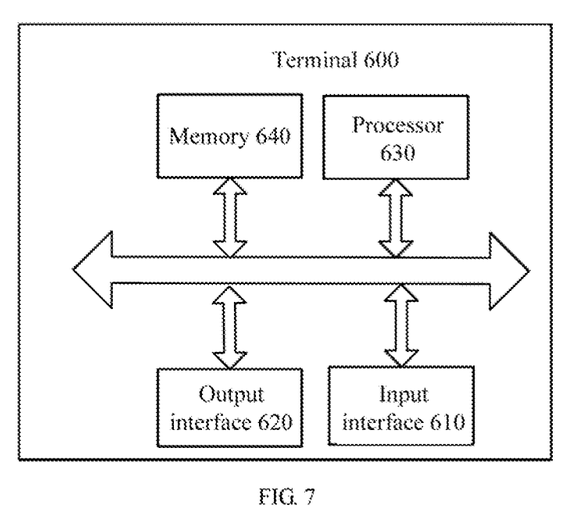
FIG. 7 shows still another schematic block diagram of a terminal according to an implementation of the present disclosure.

FIG. 7 also shows a schematic block diagram of a terminal 600 according to an implementation of the present disclosure. The terminal 600 can be the terminal 400 of FIG. 5, which can be configured to execute the content of the shared device corresponding to the method 200 of FIG. 3. The terminal 600 includes: an input interface 610, an output interface 620, a processor 630, and a memory 640. The input interface 610, the output interface 620, the processor 630, and the memory 640 can be connected through a bus system. The memory 640 is configured to store programs, instructions or codes. The processor 630 is configured to execute the programs, the instructions or the codes in the memory 640 to control the input interface 610 to receive a signal, control the output interface 620 to transmit a signal, and complete the operations in the foregoing method implementation.

Therefore, the terminal in the implementation of the present disclosure receives the personalized configuration information of the user transmitted by the user device, so that the configuration can be performed according to the user's preference, thereby improving user experience.

It should be understood, in the implementation of the present disclosure, the processor 630 can be a central processing unit (CPU), and the processor 630 can also be another general-purpose processor, a digital signal processor (DSP), an application specific integrated circuit (ASIC), a field programmable gate array (FPGA), or other programmable logic device, discrete gate or transistor logic device, discrete hardware component, etc. The general purpose processor may be a microprocessor or the processor may also be any conventional processor, etc.

The memory 640 can include a read only memory and a random access memory, and provides instructions and data to the processor 630. A portion of the memory 640 may also include a non-volatile random access memory. For example, the memory 640 may also be stored with device type information.

In the implementation process, content of the foregoing method may be completed by using an integrated logic circuit of hardware in the processor 630 or an instruction in a software form. The content of the method disclosed in the implementations of the present disclosure may be directly implemented by a hardware processor, or may be performed by using a combination of hardware and software modules in the processor. The software module can be located in a mature storage medium such as a random access memory, a flash memory, a read only memory, a programmable read only memory or an electrically erasable programmable memory, a register, or the like. The storage medium is located in the memory 640, and the processor 630 reads information in the memory 640, and completes the content of the foregoing method in combination with the hardware thereof. To avoid repetition, details will not be described herein again.

In a specific implementation, the first receiving unit and the second receiving unit in the terminal 400 may be implemented by the input interface 610 in FIG. 7, and the connection establishing unit and the resuming unit in the terminal 400 can be implemented by the processor 630 in FIG. 7.

An implementation of the present disclosure also provides a computer readable storage medium having one or more programs stored thereon, the one or more programs including instructions which, when executed by a portable electronic device including a plurality of applications, enables the portable electronic device to perform the method of the implementations of FIG. 2 and/or FIG. 3.

It may be known to persons of ordinary skill in the art that, the units and the algorithm steps of each example that are described with reference to the implementations disclosed herein can be implemented by electronic hardware or a combination of electronic hardware and computer software. The situation whether these functions are performed by hardware or software depends on specific applications and design constraints of the technical solutions. Persons skilled in the art may implement the described functions by using different methods for each specific application, but such implementation should not be regarded as going beyond the scope of the implementations of the present disclosure.

It may be clearly understood by a person skilled in the art that, for the purpose of convenient and brief description, reference may be made to the corresponding processes in the foregoing method implementations for detailed working processes of the foregoing systems, devices, and units, and details will not be described herein again.

In several implementations provided in the present disclosure, it should be understood that the disclosed systems, devices, and methods may be implemented in other manners. For example, the described device implementations are merely exemplary. For instance, the division of the units is merely a division of logical functions and there may be other divisions during actual implementations. For instance, multiple units or components may be combined or integrated into another system, or some features may be omitted or not performed. In addition, the presented or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the implementations.

In addition, functional units in the implementations of the present disclosure may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solutions in the implementations of the present disclosure essentially, or the pan contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in the implementations of the present disclosure. The foregoing storage medium includes: any medium that can store program codes, such as a USB flash disk, a mobile hard disk, a Read-Only Memory (ROM), a Random Access Memory (RAM), a magnetic disk, or an optical disc, etc.

The above descriptions are merely specific implementations in the implementations of the present disclosure; however, the protection scope of the implementations of the present disclosure is not limited thereto. Any modification or replacement that may be readily conceived by persons skilled in the art within the technical scope disclosed in the implementations of the present disclosure should fall into the protection scope of the implementations of the present disclosure. Therefore, the protection scope of the implementations of the present disclosure shall be subject to the claims.

What is claimed is:

1. A method for controlling a shared device, comprising:
   receiving, by a user device, a discovery message transmitted by the shared device, wherein the discovery message is used for indicating that the shared device is in an unoccupied state;
   determining, by the user device according to the discovery message, whether the shared device is capable of establishing a connection with the user device;
   transmitting, by the user device, confirmation information to the shared device when the user device determines that the shared device is capable of establishing the connection with the user device, wherein the confirmation information is used for confirming, to the shared device, the connection with the user device; and
   triggering, by the user device, the shared device to acquire personalized configuration information of a user, wherein the personalized configuration information is used for indicating a configuration preference of the user for the shared device.

2. The method according to claim 1, further comprising:
   transmitting, by the user device, connection request information to the shared device, wherein the connection request information is used for requesting a connection with the shared device;
   receiving, by the user device, response information for the connection request information transmitted by the shared device, wherein the response information is used for indicating that the shared device is connectable to the user device; and
   determining, by the user device according to the response information, that the shared device is capable of establishing a connection with the user device.

3. The method according to claim 1, wherein the triggering, by the user device, the shared device to acquire personalized configuration information of a user comprises:
   transmitting, by the user device, the personalized configuration information to the shared device.

4. The method according to claim 3, wherein before the transmitting, by the user device, the personalized configuration information to the shared device, the method further comprises:
   acquiring, by the user device, identity information of the user; and
   acquiring, by the user device, the personalized configuration information according to the identity information.

5. The method according to claim 4, wherein the acquiring, by the user device, the personalized configuration information according to the identity information comprises:
   acquiring, by the user device, personalized configuration information corresponding to the identity information from a stored personalized configuration database according to the identity information, wherein the personalized configuration database comprises at least one piece of identity information of the user and at least one piece of personalized configuration information that has a one-to-one correspondence with the at least one piece of identity information of the user.

6. The method according to claim 4, wherein the acquiring, by the user device, the personalized configuration information according to the identity information comprises:
   transmitting, by the user device, the identity information to a server; and
   receiving, by the user device, personalized configuration information corresponding to the identity information transmitted by the server.

7. The method according to claim 4, wherein the identity information comprises password information and/or biometric information.

8. The method according to claim 7, wherein the biometric information comprises at least one of fingerprint feature information, iris feature information, face feature information, voiceprint feature information, vein feature information, and retina feature information.

9. The method according to claim 3, wherein the transmitting, by the user device, the personalized configuration information to the shared device, comprises:
   transmitting, by the user device, the personalized configuration information to the shared device directly.

10. The method according to claim 1, wherein the triggering, by the user device, the shared device to acquire personalized configuration information of a user comprises:
    transmitting, by the user device, the identity information of the user to the shared device, so that the shared device acquires personalized configuration information corresponding to the identity information from a server.

11. The method according to claim 1, further comprising:
    transmitting, by the user device, clear information to the shared device, wherein the clear information is used for indicating that the shared device is resumed to a configuration prior to the user's use.

12. The method according to claim 1, wherein the triggering, by the user device, the shared device to acquire personalized configuration information of a user, further comprises:
- performing, by the user device, personalized configuration on a shared vehicle in response to that the shared device enters the shared vehicle, wherein the personalized configuration comprises temperature and humidity inside the vehicle, favorite entertainment programs, hardness and angles of the seats, or angles of the front and rear mirrors; or
- performing, by the user device, personalized configuration on a smart control system of a house in response to that the user device enters the house, wherein the personalized configuration comprises temperature and humidity in the house, color of walls and floors, time of an alarm clock, a TV broadcast channel, or temperature of bath water.

13. The method according to claim 1, wherein the method further comprises:
- detecting, by the user device, a discovery message transmitted by a smart TV inside a hotel room periodically in response to that the user device enters the hotel room; and
- confirming, by the user device, a connection to the smart TV by inputting a password in response to that the user device detects the discovery message;

wherein the personalized configuration information sent by the user device to the smart TV comprises a TV station that the user watches frequently, so as to automatically direct to the TV station in response to that the smart TV is turned on.

14. A terminal, comprising:
- a processor, an input interface, an output interface, a memory, and a computer program stored on the memory and operable by the processor, wherein the processor executes the computer program to:
- control the input interface to receive a discovery message transmitted by a shared device, wherein the discovery message is used for indicating that the shared device is in an unoccupied state; and
- determine, according to the discovery message, whether the shared device is capable of establishing a connection with the terminal;
- control the output interface to transmit confirmation information to the shared device when the terminal determines that the shared device is capable of establishing a connection with the terminal, wherein the confirmation information is used for confirming, to the shared device, the connection with the terminal; and
- trigger the shared device to acquire personalized configuration information of a user, wherein the personalized configuration information is used for indicating a configuration preference of the user for the shared device.

15. The terminal according to claim 14, wherein the processor further executes the computer program to:
- control the output interface to transmit connection request information to the shared device, wherein the connection request information is used for requesting a connection with the shared device;
- control the input interface to receive response information for the connection request information transmitted by the shared device, wherein the response information is used for indicating that the shared device is connectable to the terminal; and
- determine, according to the response information, that the shared device is capable of establishing a connection with the terminal.

16. The terminal according to claim 14, wherein the processor executes the computer program to:
- control the output interface to transmit the personalized configuration information to the shared device.

17. The terminal according to claim 16, wherein the processor further executes the computer program to:
- acquire identity information of the user; and
- acquire the personalized configuration information according to the identity information.

18. The terminal according to claim 14, wherein the processor executes the computer program to:
- control the output interface to transmit the identity information of the user to the shared device, so that the shared device acquires personalized configuration information corresponding to the identity information from a server.

19. The terminal according to claim 14, wherein the processor further executes the computer program to:
- control the output interface to transmit clear information to the shared device, wherein the clear information is used for indicating that the shared device is resumed to a configuration prior to the user's use.

20. A method for controlling a shared device, comprising:
- transmitting, by the shared device, a discovery message to a user device, wherein the discovery message is used for indicating that the shared device is in an unoccupied state, so that the user device determines according to the discovery message, whether the shared device is capable of establishing a connection with the user device;
- receiving, by the shared device, confirmation information from the user device when the user device determines that the shared device is capable of establishing a connection with the user device, wherein the confirmation information is used for confirming, to the shared device, the connection with the user device;
- acquiring, by the shared device, personalized configuration information of a user according to received first information transmitted by the user device, wherein the personalized configuration information is used for indicating a configuration preference of the user for the shared device; and
- configuring, by the shared device, the shared device according to the personalized configuration information.

* * * * *